United States Patent
Sakai et al.

(10) Patent No.: US 9,948,144 B2
(45) Date of Patent: Apr. 17, 2018

(54) POWER TRANSMISSION SYSTEM AND POWER TRANSMISSION DEVICE USED FOR POWER TRANSMISSION SYSTEM

(71) Applicant: MURATA MANUFACTURING CO., LTD., Nagaokakyo-Shi, Kyoto-Fu (JP)

(72) Inventors: Hironori Sakai, Nagaokakyo (JP); Takanori Tsuchiya, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 183 days.

(21) Appl. No.: 14/481,220

(22) Filed: Sep. 9, 2014

(65) Prior Publication Data

US 2014/0375251 A1    Dec. 25, 2014

Related U.S. Application Data

(63) Continuation of application No. PCT/JP2013/054978, filed on Feb. 26, 2013.

(30) Foreign Application Priority Data

Mar. 26, 2012 (JP) ................. 2012-070072

(51) Int. Cl.
   *H02J 17/00* (2006.01)
   *H02J 50/00* (2016.01)
   (Continued)

(52) U.S. Cl.
   CPC ............. *H02J 50/12* (2016.02); *H02J 7/025* (2013.01); *H02J 17/00* (2013.01); *H02J 50/05* (2016.02); *H02M 7/537* (2013.01)

(58) Field of Classification Search
   CPC ..................................................... H02J 17/00
   (Continued)

(56) References Cited

U.S. PATENT DOCUMENTS 4,549,147 A * 10/1985 Kondo ...................... G05F 1/62
                                                              330/207 P
5,631,611 A * 5/1997 Luu .......................... H03H 7/40
                                                              333/17.3
(Continued)

FOREIGN PATENT DOCUMENTS

JP          3344593 B2    11/2002
JP     2004-248365 A      9/2004
                  (Continued)

OTHER PUBLICATIONS

Written Opinion and International Search Report issued in PCT/JP2013/054978, dated May 21, 2013.

*Primary Examiner* — Drew A Dunn
*Assistant Examiner* — Jerry D Robbins
(74) *Attorney, Agent, or Firm* — Arent Fox LLP

(57) ABSTRACT

A power transmission device wirelessly transmits power to a power receiving device rectifying a voltage received and supplying the voltage to a load circuit. The power transmission device includes a power transmitter that makes capacitance or electromagnetic coupling to the power receiver and transmits electric power to the power receiver, a power supply unit that generates electric power to be transmitted to the power receiving device and supplies the electric power to the power transmitter, a load impedance detector that detects a load impedance of the power receiving device based on an electric signal detected in the power transmission device, and a controller that controls the electric power to be generated by the power supply unit such that an output voltage of the rectifying circuit of the power receiving device is equal to or lower than a predetermined voltage based on a detection result of the load impedance detector.

19 Claims, 10 Drawing Sheets

(51) Int. Cl.
*H02J 50/12* (2016.01)
*H02J 50/05* (2016.01)
*H02J 7/02* (2016.01)
*H02M 7/537* (2006.01)

(58) Field of Classification Search
USPC ........................................................ 320/107
See application file for complete search history.

(56) References Cited

U.S. PATENT DOCUMENTS

| | | | | | |
|---|---|---|---|---|---|
| 8,604,873 | B2* | 12/2013 | Scott | ............... | H03F 1/30 330/104 |
| 2009/0167457 | A1* | 7/2009 | Melde | ............... | H01P 5/04 333/32 |
| 2009/0278505 | A1* | 11/2009 | Toya | ............... | H02J 7/025 320/152 |
| 2009/0302690 | A1* | 12/2009 | Kubono | ............... | H02J 5/00 307/109 |
| 2011/0248572 | A1* | 10/2011 | Kozakai | ............... | H03F 1/565 307/104 |
| 2011/0316348 | A1 | 12/2011 | Kai et al. | | |
| 2012/0008348 | A1* | 1/2012 | Chapman | ............... | H02M 3/33523 363/37 |
| 2012/0038218 | A1* | 2/2012 | Ichikawa | ............... | H02J 5/005 307/97 |
| 2012/0104998 | A1 | 5/2012 | Takada et al. | | |
| 2012/0299392 | A1 | 11/2012 | Ichikawa et al. | | |
| 2013/0099807 | A1* | 4/2013 | Wheeland | ............... | H04B 5/0037 324/713 |

FOREIGN PATENT DOCUMENTS

| | | |
|---|---|---|
| JP | 2009-296857 A | 12/2009 |
| JP | 2010-183810 A | 8/2010 |
| JP | 2010-233442 A | 10/2010 |
| JP | 201239800 A | 2/2012 |
| WO | WO 2011/127449 A2 | 10/2011 |
| WO | WO-2011-148803 A1 | 12/2011 |

\* cited by examiner

| IDC | DUTY RATIO |
|---|---|
| 0~0.1 | 37 |
| 0.1~0.2 | 38 |
| 0.2~0.3 | 39 |
| 0.3~0.4 | 40 |
| 0.4~0.5 | 41 |
| 0.5~0.6 | 42 |
| 0.6~0.7 | 43 |
| 0.7~0.8 | 44 |
| 0.8~0.9 | 45 |
| 0.9~1.0 | 46 |
| 1.0~1.1 | 47 |
| 1.1~1.2 | 48 |
| 1.2~1.3 | 49 |
| 1.3~1.4 | 50 | ance voltage, and the like of the power receiving device. In the power transmission system as disclosed in Patent Document 1, in order to control the electric power that is transmitted to the value appropriate for the power receiving device, wireless communication circuits are provided on the power transmission device and the power receiving device and transmit and receive a control signal to and from each other.

Patent Document 1: Japanese Patent No. 3344593.
Patent Document 2: International Publication Pamphlet No. WO2011/148803.

In the power transmission system as disclosed in Patent Document 1, in order to control the electric power that is transmitted to the value appropriate for a state of the power receiving device, the communication circuits for making communication with each other are required to be provided on the power transmission device and the power receiving

POWER TRANSMISSION SYSTEM AND POWER TRANSMISSION DEVICE USED FOR POWER TRANSMISSION SYSTEM

CROSS REFERENCE TO RELATED APPLICATIONS

The present application is a continuation of PCT/JP2013/054978 filed Feb. 26, 2013, which claims priority to Japanese Patent Application No. 2012-070072, filed Mar. 26, 2012, the entire contents of each of which are incorporated herein by reference.

FIELD OF THE INVENTION

The present invention relates to a power transmission system that transmits electric power wirelessly and a power transmission device that is used for the power transmission system.

BACKGROUND OF THE INVENTION

In recent years, for example, a wireless power transmission system that supplies electric power to a portable apparatus such as a smart phone and a laptop personal computer wirelessly has been put to practical use. As the wireless power transmission system, there is a wireless power transmission system disclosed in Patent Document 1, for example.

Patent Document 1 discloses an electromagnetic induction-type wireless power transmission system. The electromagnetic induction-type wireless power transmission system includes a power transmission device and a power receiving device. The power transmission device includes a power transmission coil, the power receiving device includes a power receiving coil, and electric power is transmitted between these coils by electromagnetic induction.

Patent Document 2 discloses an electric field coupling-type wireless power transmission system. The electric field coupling-type wireless power transmission system includes a power transmission device and a power receiving device. The power transmission device includes a power transmission electrode, the power receiving device includes a power receiving electrode, and electric power is transmitted between these electrodes by electrostatic induction.

In the above-mentioned systems, electric power that is transmitted from the power transmission device is required to be controlled to a value appropriate for the power receiving device in consideration of an operation voltage, a withst device. For this reason, the configurations of the power transmission device and the power receiving device become complicated.

SUMMARY OF THE INVENTION

An object of the present invention is to provide a power transmission system that can supply appropriate electric power in accordance with a load state to a power receiving device without providing communication circuits on a power transmission device and the power receiving device, and a power transmission device that is used for the power transmission system.

The present invention provides a power transmission device that wirelessly transmits electric power to a power receiving device rectifying a voltage received by a power receiver with a rectifying circuit and supplying the voltage to a load circuit. The power transmission device includes a power transmitter that makes capacitance coupling or electromagnetic coupling to the power receiver of the power receiving device and transmits electric power to the power receiver, a power supply unit that generates electric power to be transmitted to the power receiving device and supplies the electric power to the power transmitter, a load impedance detector that detects a load impedance of the power receiving device based on an electric signal detected in the power transmission device, and a controller that controls the electric power to be generated by the power supply unit such that an output voltage of the rectifying circuit of the power receiving device is equal to or lower than a predetermined voltage based on a detection result of the load impedance detector.

The present invention provides a power transmission system that includes a power receiving device including a power receiver and a load circuit, and the above-mentioned power transmission device.

The present invention provides a power transmission method in a power transmission device that wirelessly transmits electric power to a power receiving device rectifying a voltage received by a power receiver and supplying the voltage to a load circuit. The power transmission method includes generating electric power to be transmitted to the power receiving device and supplying the electric power to the power transmitter, detecting a load impedance of the power receiving device based on an electric signal detected in the power transmission device, and controlling electric power to be supplied to the power transmitter such that an output voltage of a rectifying circuit of the power receiving device is equal to or lower than a predetermined voltage based on a detection result of the load impedance.

According to the present invention, a load state of a power receiving device is detected in a power transmission device. The electric power to be supplied to the power receiving device is controlled such that the output voltage of a rectifying circuit of the power receiving device is equal to or lower than the predetermined voltage based on a detection result. Accordingly, appropriate electric power can be supplied to the power receiving device without providing communication circuits on the power transmission device and the power receiving device.

DETAILED DESCRIPTION OF THE PREFERRED EMBODIMENTS

First Embodiment

1. Configuration
1.1 Overall Configuration

Figure 1:
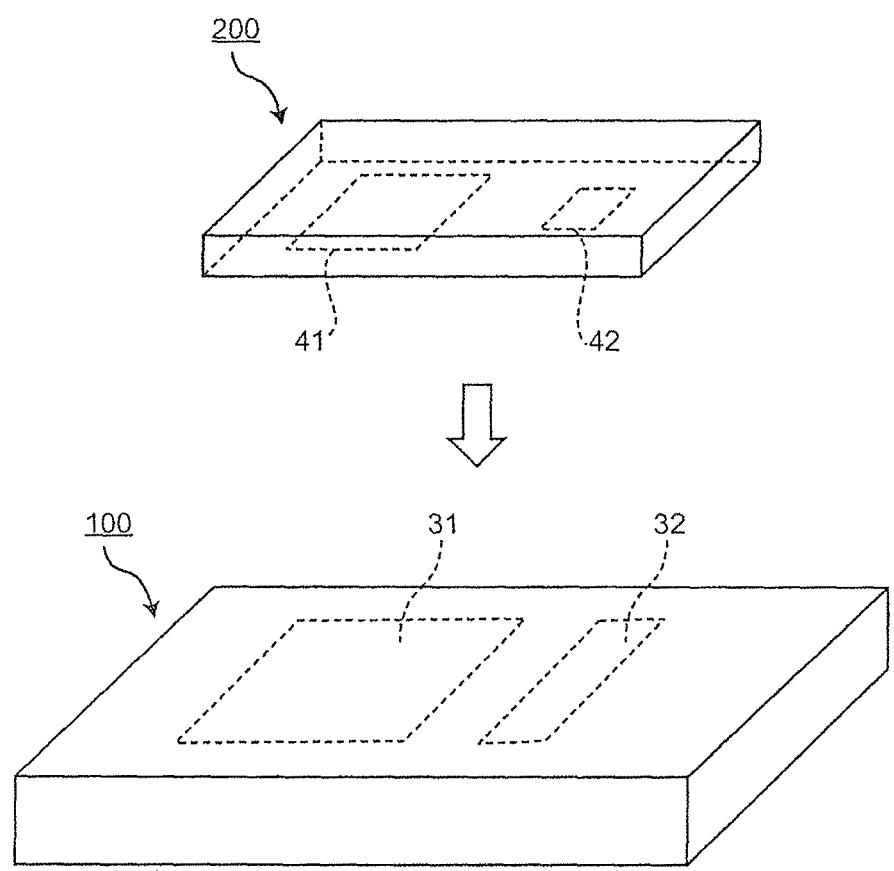
FIG. 1 is a perspective view showing a power transmission device and a power receiving device according to a first embodiment.

FIG. 1 is a perspective view showing a power transmission device 100 and a power receiving device 200 constituting an electric field coupling-type wireless power transmission system in a first embodiment.

The power transmission device 100 includes a power transmission device-side passive electrode 31 and a power transmission device-side active electrode 32. The power receiving device 200 includes a power receiving device-side passive electrode 41 and a power receiving device-side active electrode 42.

The power receiving device 200 is placed on the power transmission device 100 so that coupling capacitances are generated between the power transmission device-side passive electrode 31 and the power receiving device-side passive electrode 41 and between the power transmission device-side active electrode 32 and the power receiving device-side active electrode 42. In this state, the power transmission device 100 transmits electric power to the power receiving device 200 by electric field coupling.

Figure 2:
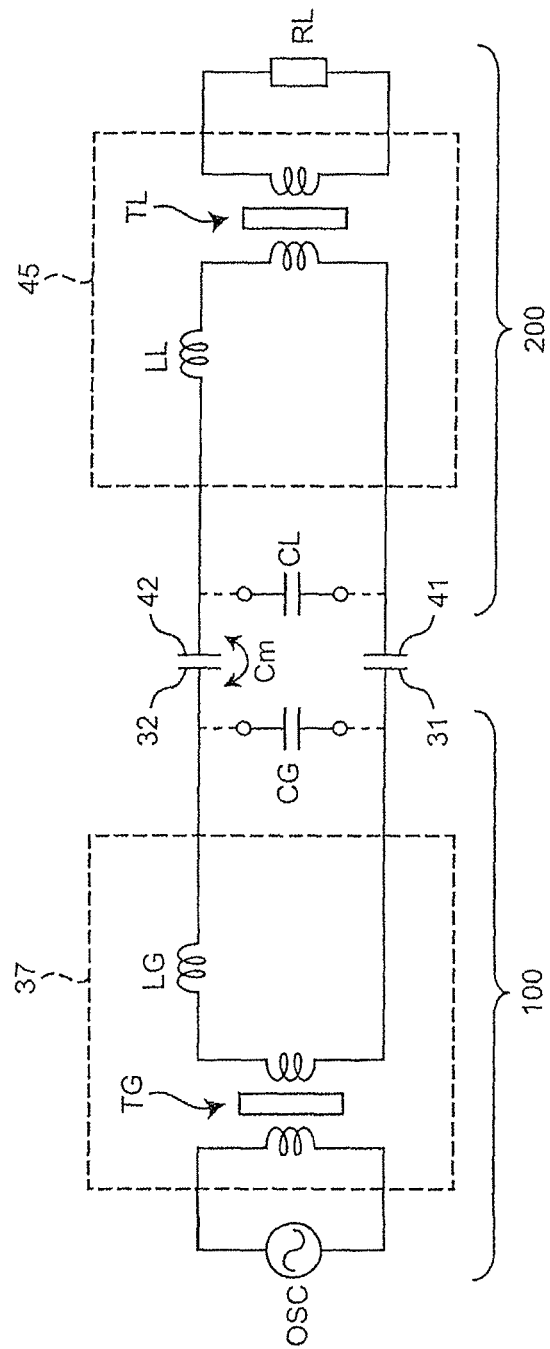
FIG. 2 is an equivalent circuit diagram of a wireless power transmission system.

FIG. 2 is an equivalent circuit diagram of the wireless power transmission system. In FIG. 2, a high-frequency voltage generation circuit OSC of the power transmission device 100 generates a high-frequency voltage of 100 kHz to several tens MHz, for example. A booster circuit 37 formed by a booster transformer TG and an inductor LG boosts the voltage that is generated by the high-frequency voltage generation circuit OSC and applies the voltage between the power transmission device-side passive electrode 31 and the power transmission device-side active electrode 32. A capacitor CG is a parasitic capacitance that is generated between the power transmission device-side passive electrode 31 and the power transmission device-side active electrode 32. The inductor LG and the capacitor CG constitute a power transmission device-side resonance circuit. A step-down circuit 45 constituted by a step-down transformer TL and an inductor LL is connected to and interposed between the power receiving device-side passive electrode 41 and the power receiving device-side active electrode 42 of the power receiving device 200. The step-down circuit 45 steps down a voltage received by the power receiving device-side passive electrode 41 and the power receiving device-side active electrode 42 and supplies the voltage to a load circuit. A capacitor CL is a parasitic capacitance that is generated between the power receiving device-side passive electrode 41 and the power receiving device-side active electrode 42. The inductor LL and the capacitor CL constitute a power receiving device-side resonance circuit. A load circuit RL is connected to the secondary side of the step-down transformer TL. The load circuit RL is constituted by a DC/DC converter and a secondary battery. A capacitor Cm illustrates a state of the capacitance coupling between the power transmission device-side passive electrode 31 and the power receiving device-side passive electrode 41 and the capacitance coupling between the power transmission device-side active electrode 32 and the power receiving device-side active electrode 42.

Figure 3:
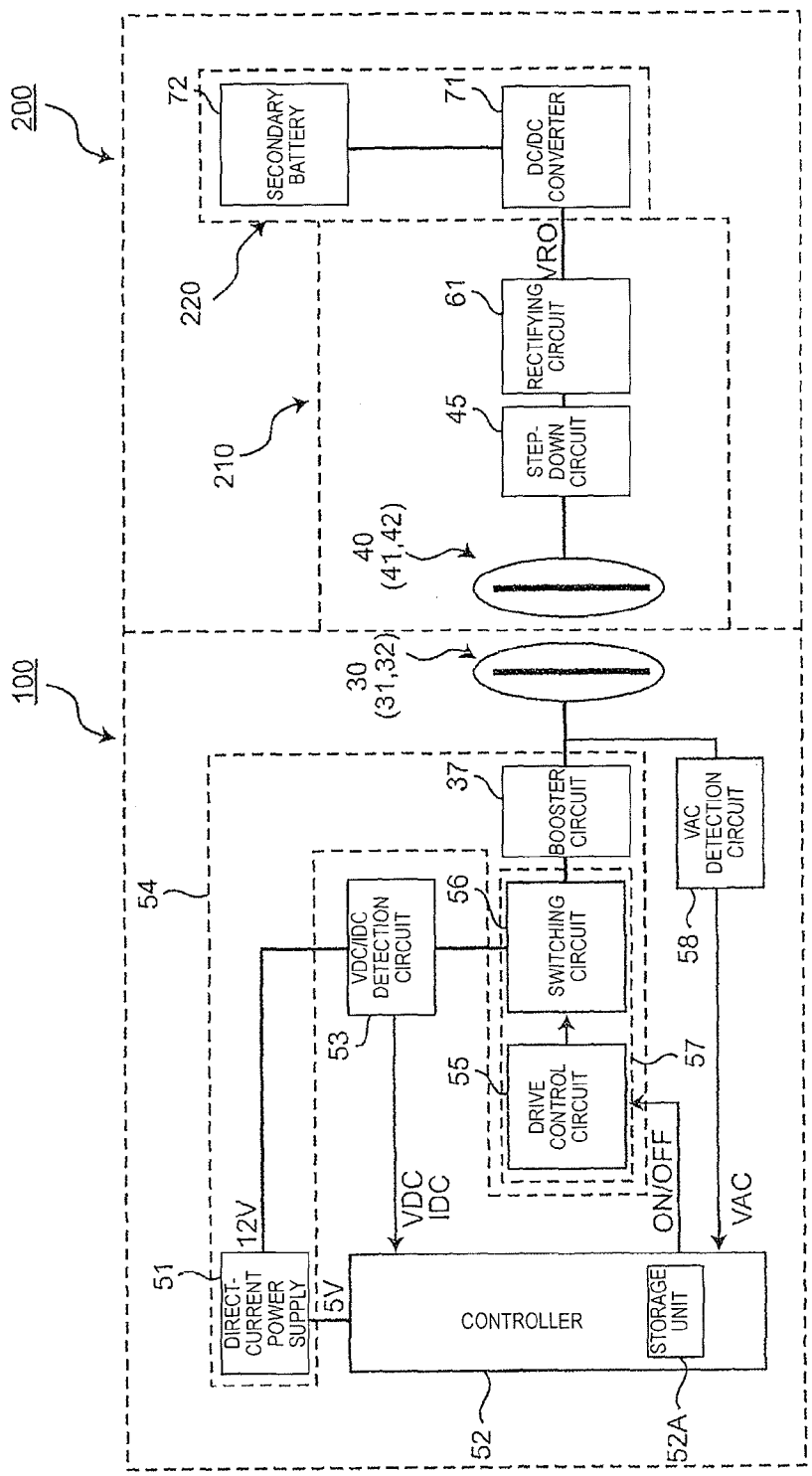
FIG. 3 is a block configuration diagram of the power transmission device and the power receiving device.

FIG. 3 is a block diagram illustrating the specific configurations of the power transmission device 100 and the power receiving device 200. Hereinafter, the respective specific configurations of the power transmission device 100 and the power receiving device 200 will be described.

1.2 Power Transmission Device

The power transmission device 100 includes a power transmitter 30, a power supply unit 54, a controller 52, a VDC/IDC detection circuit 53, and a VAC detection circuit 58.

The power transmitter 30 includes the power transmission device-side passive electrode 31 and the power transmission device-side active electrode 32.

The power supply unit 54 is a unit for supplying electric power to the power transmitter 30 (power transmission device-side passive electrode 31 and power transmission device-side active electrode 32) and includes a direct-current (DC) power supply 51, a power converter 57, and a booster circuit 37.

The DC power supply 51 is input with a DC voltage of DC 12 V, generates a DC voltage of DC 5 V, and supplies it to the controller 52. Furthermore, the DC power supply 51 supplies the input DC voltage of DC 12 V to the VDC/IDC detection circuit 53 and the power converter 57.

The VDC/IDC detection circuit 53 detects a voltage value VDC of the DC voltage that is supplied to a switching circuit 56 from the DC power supply 51 and a current value IDC of an electric current flowing through the switching circuit 56. Furthermore, the VDC/IDC detection circuit 53 outputs a VDC signal relating to the DC voltage value VDC and an IDC signal relating to the DC current value IDC.

The power converter 57 includes the switching circuit 56 and a drive control circuit 55. The power converter 57 corresponds to the high-frequency voltage generation circuit OSC as illustrated in FIG. 2.

Figure 4:
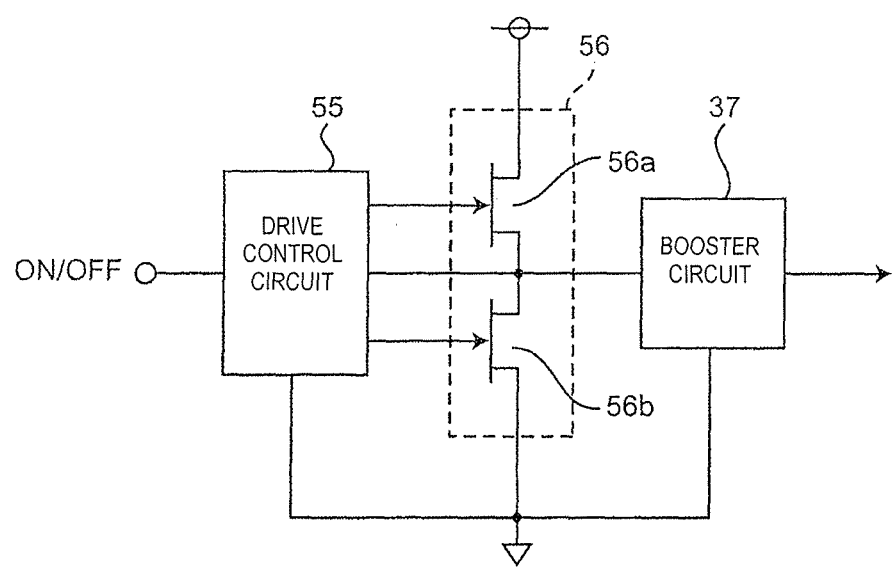
FIG. 4 is a diagram illustrating the configuration of a switching circuit.

The switching circuit 56 switches the DC voltage of DC 12 V supplied from the DC power supply 51 based on a driving signal from the drive control circuit 55 so as to convert it to an alternating-current (AC) voltage, and outputs the AC voltage. FIG. 4 illustrates the specific configuration of the switching circuit 56. The switching circuit 56 includes a high-side switch element 56a and a low-side switch element 56b. The switching circuit 56 performs push-pull operations by turning ON/OFF these switch elements 56a and 56b so as to alternately drive the booster circuit 37.

The drive control circuit 55 drives the switch elements 56a and 56b of the switching circuit 56 in accordance with a signal output from the controller 52.

Returning back to FIG. 3, the booster circuit 37 boosts the AC voltage output from the switching circuit 56, and applies it between the power transmission device-side passive electrode 31 and the power transmission device-side active electrode 32. The booster circuit 37 includes the booster transformer TG and the inductor LG (see FIG. 2). A secondary winding of the booster transformer TG is connected to and interposed between the power transmission device-side passive electrode 31 and the power transmission device-side active electrode 32 and a primary winding thereof is connected to the output of the switching circuit 56. The voltage after boosted by the booster circuit 37 is a voltage in a range of 100 V to 10 kV, for example. The voltage is applied between the power transmission device-side passive electrode 31 and the power transmission device-side active electrode 32, so that an electrostatic field is generated on a medium therearound.

The controller 52 is input with the VDC signal and the IDC signal from the VDC/IDC detection circuit 53, a VAC signal from the VAC detection circuit 58, and the like.

For example, the controller 52 determines whether or not the voltage and the current of the DC power of DC 12 V output from the DC power supply 51 are within predetermined ranges based on the VDC signal and the IDC signal.

Then, when the voltage and the current of the DC power of DC 12 V are within the predetermined ranges, the controller 52 controls ON/OFF of the switch elements 56a and 56b constituting the switching circuit 56 based on the IDC signal. To be more specific, the controller 52 calculates a duty ratio of ON and OFF of the switch elements 56a and 56b constituting the switching circuit 56 based on the IDC signal, generates ON and OFF signals in the calculated duty ratio, and outputs them to the drive control circuit 55. Then, the drive control circuit 55 switches the switch elements 56a and 56b constituting the switching circuit 56 in accordance with the ON and OFF signals output from the controller 52.

The controller 52 also determines whether or not the voltage between the power transmission device-side passive electrode 31 and the power transmission device-side active electrode 32 is within a predetermined range based on the VAC signal from the VAC detection circuit 58, for example. The controller 52 makes this determination, for example, for determining whether or not the voltage is increased abnormally.

1.3 Power Receiving Device

The power receiving device 200 includes a power receiving module 210 and a load circuit 220. The power receiving module 210 includes a power receiver 40, the step-down circuit 45, and a rectifying circuit 61.

The power receiver 40 includes the power receiving device-side passive electrode 41 and the power receiving device-side active electrode 42. The power receiving device-side passive electrode 41 and the power receiving device-side active electrode 42 receive electric power from the power transmission device by the capacitance coupling to the power transmission device-side passive electrode 31 and the power transmission device-side active electrode 32, respectively.

The step-down circuit 45 steps down the voltage between the power receiving device-side passive electrode 41 and the power receiving device-side active electrode 42 and supplies it to the load circuit 220 through the rectifying circuit 61. The step-down circuit 45 includes the step-down transformer TL and the inductor LL (see FIG. 2) and a primary winding of the step-down transformer TL is connected to and interposed between the power receiving device-side passive electrode 41 and the power receiving device-side active electrode 42 and a secondary winding thereof is connected to the input of the load circuit 220.

The rectifying circuit 61 rectifies AC power from the step-down circuit 45 and outputs it to the load circuit 220. The load circuit 220 includes a DC/DC converter 71 as a voltage stabilization circuit and a secondary battery 72 connected to the secondary side of the DC/DC converter 71. The DC/DC converter 71 converts the DC voltage output from the rectifying circuit 61 to a DC voltage having a voltage value appropriate for the secondary battery 72 and outputs it to the secondary battery 72. The secondary battery 72 is charged with the voltage output from the DC/DC converter 71. The secondary battery 72 has characteristics that the impedance thereof is increased when it is closer to a full-charged state.

2. Operations of Controller of Power Transmission Device

The power transmission device 100 in the embodiment detects (estimates) a load impedance of the power receiving device 200 using a physical amount in the power transmission device 100 and controls transmission power such that electric power can be supplied to the power receiving device 200 appropriately in accordance with a load state based on the detection result. The power transmission device 100 detects the load impedance of the power receiving device 200 using the physical amount in the power transmission device 100 as described above. This eliminates necessity to obtain information relating to the load state from the power receiving device 200 so as to eliminate necessity to provide communication circuits on the power transmission device and the power receiving device.

In the embodiment, the value IDC of a current flowing through the switching circuit 56 is used as the physical amount in the power transmission device 100, which is used for detecting the load impedance of the power receiving device 200. Then, a reason why the current value IDC of the current flowing through the switching circuit 56 is used will be described with reference to FIG. 5.

Figure 5:
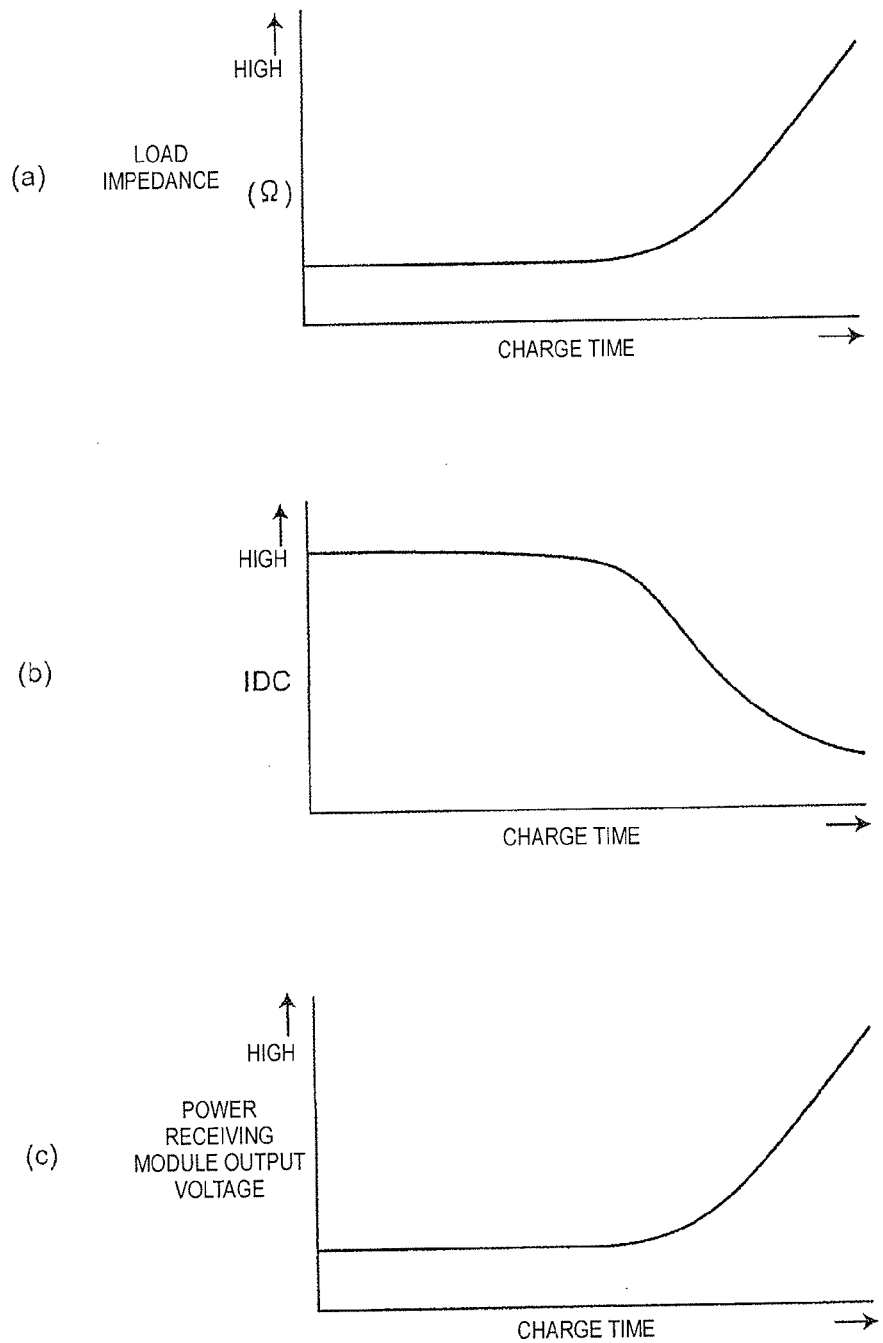
FIG. 5 are graphs illustrating characteristics of an IDC, a load impedance, an output voltage of a power receiving module with respect to charge passage time during charging of a secondary battery.

FIG. 5(a) is a graph illustrating characteristics of the load impedance when the secondary battery 72 in the load circuit 220 is being charged. FIG. 5(b) is a graph illustrating characteristics of the DC current value IDC when the secondary battery 72 is being charged. FIG. 5(c) is a graph illustrating characteristics of an output voltage of the power receiving module when the secondary battery 72 is being charged. As illustrated in FIG. 5(a), as charging of the secondary battery 72 proceeds over charge time, the impedance (load impedance) of the load circuit 220 is increased. The load impedance is obtained by combining the impedance of the DC/DC converter 71 and the impedance of the secondary battery 72. The secondary battery 72 has the characteristics that the impedance thereof is increased as the charging thereof proceeds. As the charging of the secondary battery 72 proceeds and the load impedance is increased, as illustrated in FIG. 5(b), the DC current value IDC is decreased. In this manner, change in the load impedance in the power receiving device side and the DC current value IDC in the power transmission device side have a correlation. For this reason, in the embodiment, the current value IDC of the current flowing through the switching circuit 56 is used for detecting the load impedance of the power receiving device 200. An output voltage (VRO) of the power receiving module 210 is increased as the charging of the secondary battery 72 proceeds, as illustrated in FIG. 5(*c*).

2.1 Control Flow

Figure 6:
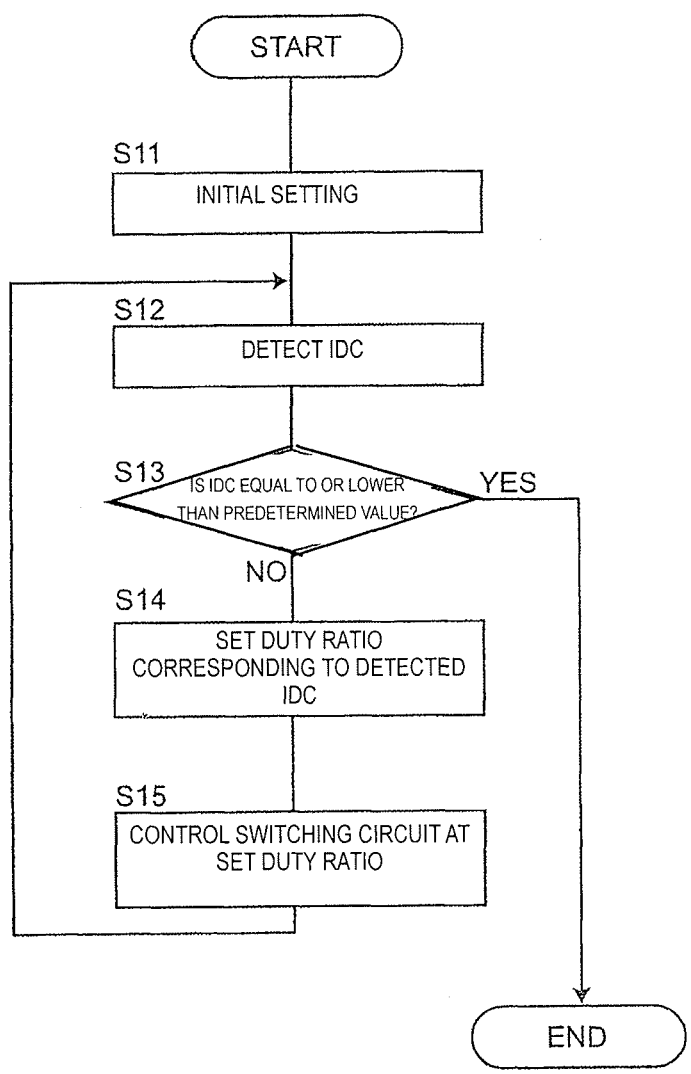
FIG. 6 is a flowchart relating to a control operation with a control circuit.

Control operations by the controller 52 in the power transmission device 100 will be described with reference to FIG. 6. The case where the power receiving device 200 is placed on the power transmission device 100 and charging of the secondary battery 72 is performed is described as an example.

When the power receiving device 200 is placed on the power transmission device 100, the controller 52 performs initial setting for starting power transmission (S11). In the initial setting, a power transmission frequency, a duty ratio, a power transmission voltage, and the alike are set.

The controller 52 is input with the IDC signal output from the VDC/IDC detection circuit 53 as a detection signal of the load impedance of the power receiving device 200 (S12). The IDC signal is a signal indicating the current value of the DC current flowing through the switching circuit 56.

Then, the controller 52 determines whether or not the DC current value IDC indicated by the input IDC signal is equal to or lower than a predetermined value (S13). When the DC current value IDC is equal to or lower than the predetermined value, the controller 52 finishes the control in the flowchart. The predetermined value is set to a value of the DC current value IDC at which the secondary battery 72 can be estimated to be in the full-charged state. When the DC current value IDC is not equal to or lower than the predetermined value, the controller 52 sets the duty ratio corresponding to the DC current value IDC (S14). In the embodiment, the duty ratio is set in accordance with the DC current value IDC (that is to say, load impedance). With this, the duty ratio in accordance with the state (load impedance) of the load circuit 220 of the power receiving device 200 can be set. The output power is controlled using the duty ratio, so that appropriate electric power can be supplied to the power receiving device 200. A specific setting method of the duty ratio will be described later.

Subsequently, the controller 52 generates ON/OFF signals at the set duty ratio and outputs them to the drive control circuit 55 (S15) and the process returns to step S12. The drive control circuit 55 controls ON/OFF of the switch elements 56*a* and 56*b* of the switching circuit 56 based on the ON/OFF signals.

2.2 Setting of Duty Ratio for Switching Circuit

As described above, in the embodiment, the duty ratio for the switching circuit 56 is set in accordance with the DC current value IDC (that is, load impedance). The duty ratio is set in advance such that an output voltage VRO of the rectifying circuit 61 of the power receiving device 200 does not exceed a constant voltage. Hereinafter, the setting of the duty ratio for the DC current value IDC will be described.

Figures 7, 8:
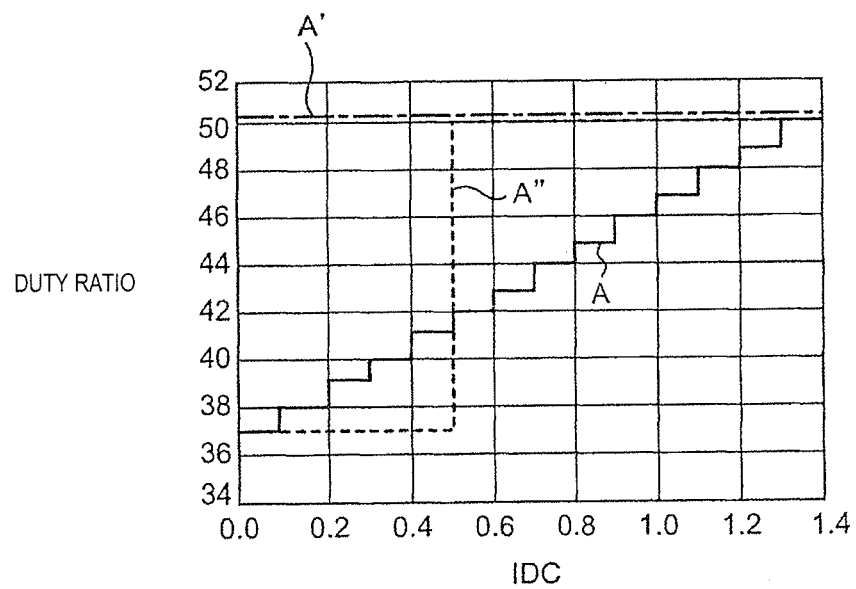
FIG. 7 is a view illustrating a specific example of a setting table of a duty ratio with respect to the IDC.
FIG. 8 is a graph illustrating characteristics of the duty ratio with respect to the IDC, which corresponds to the table in FIG. 7.

In the embodiment, the duty ratio for the DC current value IDC is defined on a setting table. The controller 52 determines the duty ratio to the switch elements 56*a* and 56*b* of the switching circuit 56 based on the DC current value IDC with reference to the setting table. FIG. 7 illustrates an example of the setting table of the duty ratio for the DC current value IDC. The setting table is stored in a storage unit 52A in the controller 52. The setting table indicates values when a rated voltage of the DC/DC converter 71 is approximately 21 V. For example, the duty ratio is set at 14 stages in increments of 0.1 A of the DC current value IDC in the setting table. The duty ratio is set such that the DC voltage value VRO output from the rectifying circuit 61 of the power receiving module 210 is substantially constant.

FIG. 8 is a graph illustrating a relation of the duty ratio with the DC current value IDC on the setting table in FIG. 7. As illustrated in FIG. 8, the duty ratio changes by 1% in a stepwise in increments of 0.1 A following the change of the DC current value IDC as indicated by a solid line A based on the setting table in FIG. 7. To be specific, the duty ratio is increased by 1% in a stepwise every time the DC current value IDC is increased by 0.1 A. During the charging of the secondary battery 72, the DC current value IDC is the largest at the initial time of charging and is decreased toward the full-charged state. Accordingly, during the charging of the secondary battery 72, the duty ratio is decreased toward the full-charged state.

Figure 9:
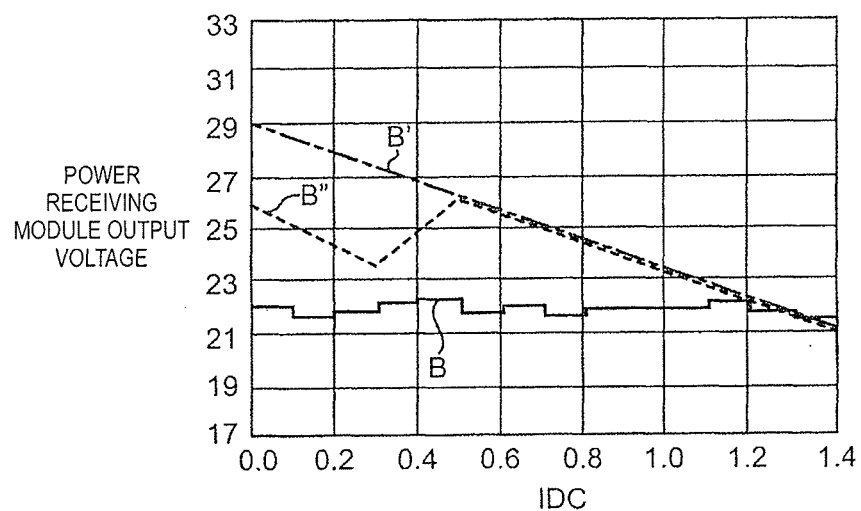
FIG. 9 is a graph illustrating characteristics of the output voltage of the power receiving module with respect to the IDC, which corresponds to the table in FIG. 7.

FIG. 9 is a graph illustrating characteristics of an output voltage of the power receiving module with respect to the DC current value IDC on the setting table in FIG. 7. The duty ratio is controlled based on the DC current value IDC with reference to the setting table in FIG. 7. With this, as indicated by a solid line B, even when the DC current value IDC changes (is lowered), the output voltage of the power receiving module is controlled to be substantially constant at approximately 22 V.

Figure 10:
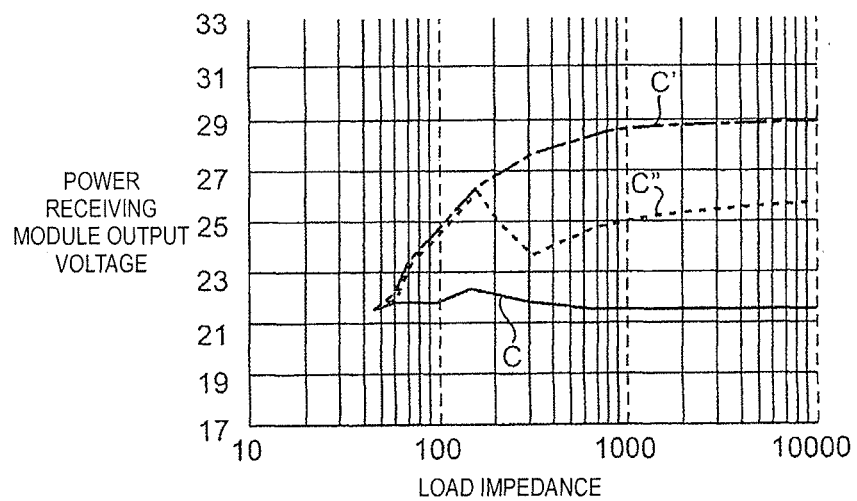
FIG. 10 is a graph illustrating the characteristics of the output voltage of the power receiving module based on a relation with the load impedance.

FIG. 10 is a graph illustrating characteristics of the output voltage of the power receiving module based on a relation with the load impedance. In the embodiment, as indicated by a solid line C, even when the load impedance is increased, the output voltage of the power receiving module is substantially constant at approximately 22 V.

Dashed-dotted lines A', B', and C' in FIG. 8, FIG. 9, and FIG. 10, respectively, indicate characteristics in the existing technique. In the existing technique, as indicated by the dashed-dotted line A' in FIG. 8, the duty ratio is constant regardless of the DC current value IDC. As indicated by the dashed-dotted line B' in FIG. 9, when the DC current value IDC is decreased, the output voltage of the power receiving module is increased. As indicated by the dashed-dotted line C' in FIG. 10, when the load impedance is increased, the output voltage of the power receiving module is increased. In this example, the output voltage of the power receiving module is increased by approximately 8 V from approximately 21 V to approximately 29 V.

In the setting table as illustrated in FIG. 7, in a range where the DC current value IDC is 0 to 1.4 A, the duty ratio is set at 14 stages in increments of 0.1 A. However, the duty ratio is not limited to being set in this manner. For example, as indicated by a dashed line A" in FIG. 8, the duty ratio may be set at 2 stages in the range where the DC current value IDC is 0 to 1.4 A. In this example, the duty ratio is set to 37% when the IDC is lower than 0.5 A and is set to 50% when the IDC is equal to or higher than 0.5 A. Dashed lines B" and C" in FIG. 9 and FIG. 10 indicate the characteristics when the duty ratio is set at 2 stages in this manner. In this case, as indicated by the dashed line B" in FIG. 9, the output voltage of the power receiving module is also higher as a whole and a fluctuation width thereof is larger than those in the case where the duty ratio is controlled at 14 stages as described above. However, in comparison with the existing case where the duty ratio is not controlled as indicated by the dashed-dotted line B', the fluctuation width of the output voltage of the power receiving module is decreased and the maximum value thereof (when the IDC is 0 A) is also lowered. Furthermore, as indicated by the dashed line C" in FIG. 10, the output voltage of the power receiving module is increased by approximately 5 V to be approximately 26 V at the highest until the load impedance is increased to approximately 200Ω. At this time, the duty ratio is changed to 37%, so that the output voltage of the power receiving module does not exceed the value thereafter. The duty ratio is controlled at 2 stages without necessity to prepare the table as illustrated in FIG. 7 or the like, thereby obtaining an effect that the configuration of switching control of the duty ratio is simplified. This can be applied as long as the output voltage of the power receiving module is allowable for the withstand voltage and the operation characteristics of the DC/DC converter 71.

Figure 11:
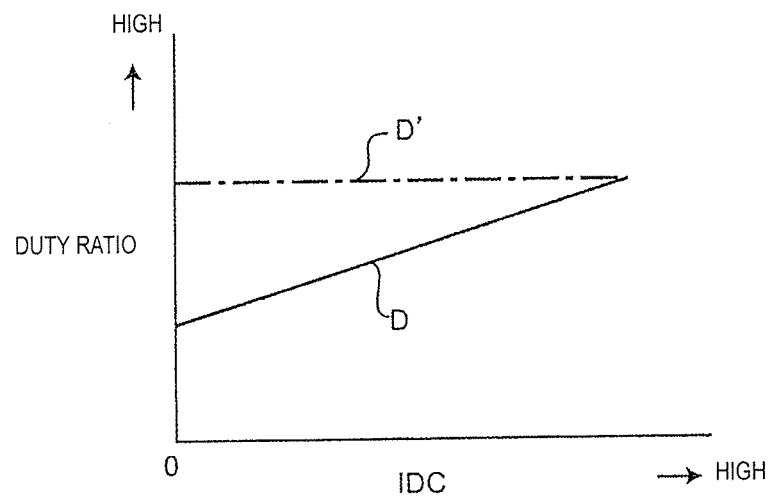
FIG. 11 is a graph illustrating characteristics of the duty ratio with respect to the IDC.
Figure 12:
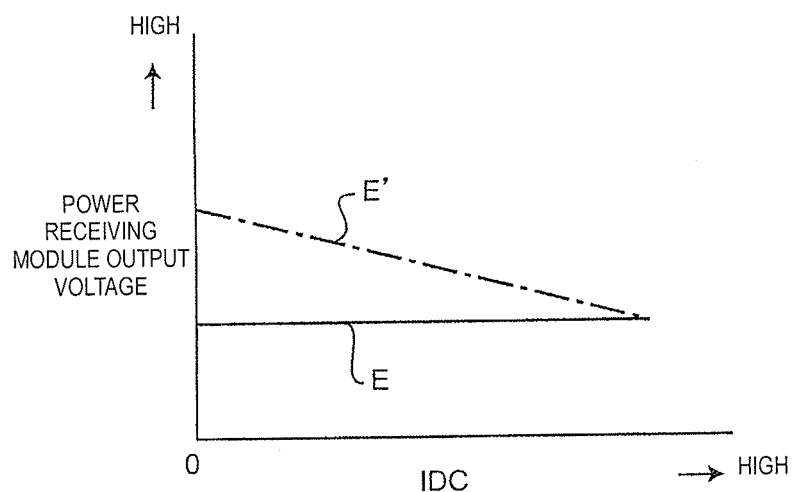
FIG. 12 is a graph illustrating characteristics of the output voltage of the power receiving module with respect to the IDC.

In the above-mentioned example, the duty ratio is controlled at 14 stages or 2 stages in accordance with the DC current value IDC. However, the setting manner of the duty ratio is not limited thereto. For example, the duty ratio may be set as illustrated in FIG. 11. FIG. 11 is a graph illustrating a setting table T of the duty ratio with respect to the IDC in another example. In this example, as indicated by a solid line D in FIG. 11, the duty ratio is changed continuously (with no stage) in proportion to the DC current value IDC. In this case, the duty ratio in accordance with the IDC can be obtained by calculation using a function or the like instead of the setting table. FIG. 12 is a graph illustrating characteristics of the output voltage of the power receiving module with respect to the IDC. The duty ratio is set such that the DC voltage output from the rectifying circuit 61 of the power receiving module 210 is substantially constant as indicated by a solid line E in FIG. 12 even when the IDC is decreased. A dashed-dotted line D' in FIG. 11 and a dashed-dotted line E' in FIG. 12 indicate the above-mentioned existing example.

3. Overview

The power transmission device 100 in the embodiment is the power transmission device 100 that wirelessly transmits electric power to the power receiving device 200 rectifying a voltage received by the power receiver 40 with the rectifying circuit 61 and supplying it to the load circuit 220. The power transmission device 100 includes the power transmitter 30 that makes capacitance coupling or electromagnetic coupling to the power receiver 40 of the power receiving device 200 and transmits electric power to the power receiver 40, the power supply unit 54 that generates electric power to be transmitted to the power receiving device 200 and supplies the electric power to the power transmitter 30, the load impedance detector that detects a load impedance of the power receiving device 200 based on an electric signal detected in the power transmission device 100, and the controller 52 that controls electric power to be generated by the power supply unit 54 such that an output voltage of the rectifying circuit 61 of the power receiving device 200 is equal to or lower than a predetermined voltage based on a detection result of the load impedance detector.

The power transmission device 100 in the embodiment detects (estimates) the load impedance of the power receiving device 200 using the DC current value IDC (electric signal) detected in the power transmission device 100 and controls power to be supplied to the power receiving device 200 such that the output voltage of the rectifying circuit 61 of the power receiving device 200 is equal to or lower than the predetermined voltage based on the detection result. With this, the output voltage can be controlled to be constant regardless of the coupling state between the power receiving device and the power transmission device or the load state. This enables the power transmission device 100 to supply appropriate electric power in accordance with the load state to the power receiving device 200 without providing communication circuits on the power transmission device 100 and the power receiving device 200.

In addition, a sensor for detecting the state of the load circuit 220, or the like, is not also needed in the power receiving device 200. Meanwhile, the power receiving device 200 is a smart phone or a mobile phone, for example, and is required to be reduced in cost and size. According to the embodiment, the power receiving device 200 is not required to include the communication circuit with the power transmission device 100 and components such as the sensor for detecting the load state. This can reduce the substrate of the power receiving module 210 and the power receiving device 200 in size and cost.

In the power transmission device 100 in the embodiment, the power supply unit 54 includes the DC power supply 51 that supplies DC power at a predetermined voltage and the power converter 57 that converts the DC power supplied from the DC power supply 51 to AC power and supplies it to the power transmitter 30. The load impedance detector detects the current value IDC of the DC current flowing from the DC power supply 51 to the power converter 57. The controller 52 controls a power conversion mode in the power converter 57 such that electric power appropriate for the load circuit 220 of the power receiving device 200 is supplied based on the DC current value IDC detected by the load impedance detector.

With this configuration, the power conversion mode in the power converter 57 is controlled such that electric power appropriate for the load circuit 220 of the power receiving device 200 is supplied based on the current value IDC of the DC power which is supplied from the DC power supply 51 to the power converter 57. The value IDC of the DC current which is supplied from the DC power supply 51 to the power converter 57 reflects the change in the impedance of the secondary battery 72 preferably as described above. Accordingly, even when the state of the load circuit 220 of the power receiving device 200 is changed, the electric power appropriate for the load circuit 220 can be supplied.

In the power transmission device 100 in the embodiment, DC power is supplied to the load circuit 220 of the power receiving device 200. The power converter 57 switches ON/OFF of the DC voltage that is supplied from the DC power supply 51 periodically so as to generate AC power. The controller 52 controls the duty ratio of ON/OFF in the power converter 57 based on the DC current value IDC detected by the load impedance detector.

With this configuration, the duty ratio of ON/OFF in the power converter 57 is controlled based on the DC current value IDC detected by the load impedance detector. This prevents an overvoltage from being applied to the load circuit 220. In addition, control can be performed easily and reliably with the control of the duty ratio.

In the power transmission device 100 in the embodiment, the duty ratio for the detected current value IDC is determined based on the relation previously defined between the current value IDC of the DC current and the duty ratio.

With this configuration, control of the duty ratio can be performed easily with a simple configuration.

In the embodiment, the load circuit 220 includes the DC/DC converter 71 and the secondary battery 72 that is connected to the secondary side of the DC/DC converter 71.

With this configuration, the voltage that is applied to the DC/DC converter 71 and the secondary battery 72 can be set to be constant.

Furthermore, in the embodiment, the power receiver 40 includes the power receiving device-side active electrode 42

(power receiving-side first electrode) and the power receiving device-side passive electrode 41 (power receiving-side second electrode), and the power transmitter 30 includes the power transmission device-side active electrode 32 (power transmission-side first electrode) that makes capacitance coupling to the power receiving device-side active electrode 42 (power receiving-side first electrode) and the power transmission device-side passive electrode 31 (power transmission-side second electrode) that makes capacitance coupling to the power receiving device-side passive electrode 41 (power receiving-side second electrode).

With this configuration, the above-mentioned various effects are obtained in the electric field coupling-type power transmission.

In the power transmission device 100 in the embodiment, the voltage of the power transmission device-side active electrode 32 (power transmission-side first electrode) is higher than the voltage of the power transmission device-side passive electrode 31 (power transmission-side second electrode) during power transmission.

With this configuration, the voltages of the power transmission device-side active electrode 32 (power transmission-side first electrode) and the power receiving device-side active electrode 42 (power receiving-side first electrode) can be made high. This can increase power transmission efficiency.

The power transmission device 100 in the embodiment further includes the booster transformer TG of which second winding is connected to and interposed between the power transmission device-side active electrode 32 (power transmission-side first electrode) and the power transmission device-side passive electrode 31 (power transmission-side second electrode) and primary winding is connected to the output of the power converter 57.

With this configuration, the voltages of the power transmission device-side active electrode 32 (power transmission-side first electrode) and the power receiving device-side active electrode 42 (power receiving-side first electrode) can be made higher. This enables large electric power to be transmitted with a low electric current so as to reduce power loss due to conductor loss in a power transmission path. This can further increase power transmission efficiency.

Furthermore, in the embodiment, provided is the power transmission system including the power receiving device 200 having the power receiver 40 and the load circuit 220 and the above-mentioned power transmission device 100.

With the power transmission system in the embodiment, the same effects as those described for the power transmission device 100 can be obtained.

In addition, in the embodiment, provided is a transmission method in the power transmission device 100 that wirelessly transmits electric power to the power receiving device 200 rectifying a voltage received by the power receiver 40 and supplying the voltage to the load circuit 61. The transmission method includes generating electric power to be transmitted to the power receiving device 200 and supplying the electric power to the power transmitter 30, detecting a load impedance of the power receiving device 200 based on an electric signal detected in the power transmission device 100, and controlling electric power to be supplied to the power transmitter 30 such that an output voltage of the rectifying circuit 61 of the power receiving device 200 is equal to or lower than a predetermined voltage based on a detection result of the load impedance.

With the transmission method in the embodiment, the same effects as those described for the power transmission device 100 can be obtained.

Other Embodiments

In the embodiment, the invention is applied to the electric field coupling-type power transmission system. However, the invention can be also applied to a magnetic field coupling-type power transmission system.

Although the VDC/IDC detection circuit 53 detects the load impedance in the power receiving device in the embodiment, the VAC detection circuit 58 may detect the load impedance instead. The AC voltage value VAC that is detected by the VAC detection circuit 58 indicates a voltage in accordance with the impedance of the secondary battery 72 same as the DC current value IDC that is detected by the VDC/IDC detector 53. Accordingly, effects that are the same as those obtained in the case of using the VDC/IDC detector 53 can be obtained.

Furthermore, in the embodiment, in control of the output power of the power transmission device 100, the duty ratio of the respective switch elements of the switching circuit 56 is controlled in accordance with the load impedance (PWM control). The invention is not limited thereto. Alternatively, in control of the output power of the power transmission device 100, the magnitude of the DC voltage VDC that is input to the switching circuit 56 may be controlled in accordance with the load impedance (PAM control).

Furthermore, although the secondary battery 72 as a load is connected to the secondary side of the DC/DC converter 71 of the load circuit 220 in the embodiment, the invention can be applied to the case where a component other than the secondary battery 72 is used. For example, a constant voltage can be supplied to an electronic apparatus of which load impedance changes in accordance with the operation state even when the load impedance changes. Therefore, the operations of the electronic apparatus can be made stable regardless of the variation of the load impedance.

Figure 13:
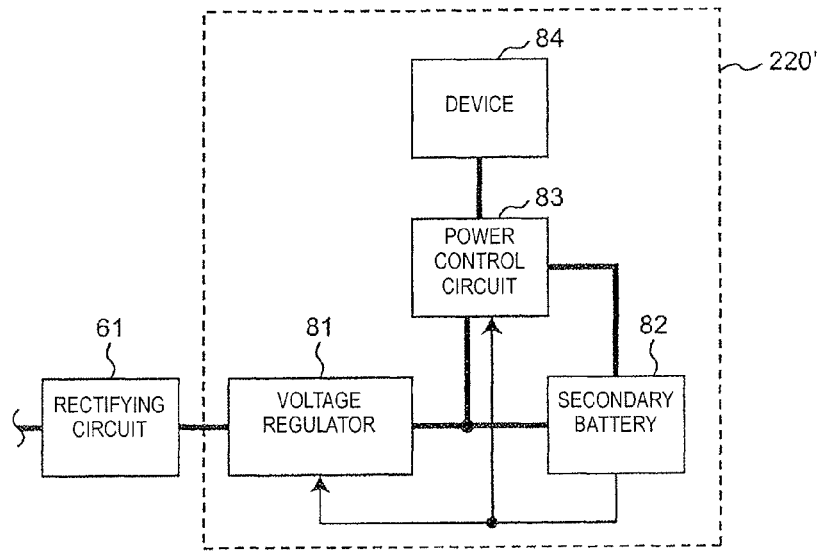
FIG. 13 is a block configuration diagram illustrating another example of a load circuit.

Although the load circuit 220 including the DC/DC converter 71 as the voltage stabilization circuit and the secondary battery 72 as the secondary-side load of the DC/DC converter 71 is explained in the embodiment, the invention is not limited thereto. For example, as illustrated in FIG. 13, the invention can be applied to the case where a load circuit 220' includes a voltage regulator 81 as a voltage stabilization circuit, a secondary battery 82 as a secondary-side load of the voltage regulator 81, a device 84 operating with electric power that is supplied from the secondary battery 82 or the voltage regulator 81, and a power control circuit 83 controlling supply of the electric power to the device 84. The secondary battery 82 incorporates a charge control circuit. Also in this example, a constant voltage can be supplied even when the load impedance changes. Therefore, the operations of the electronic apparatuses including the device 84 or the like can be made stable regardless of the variation of the load impedance.

Figure 14:
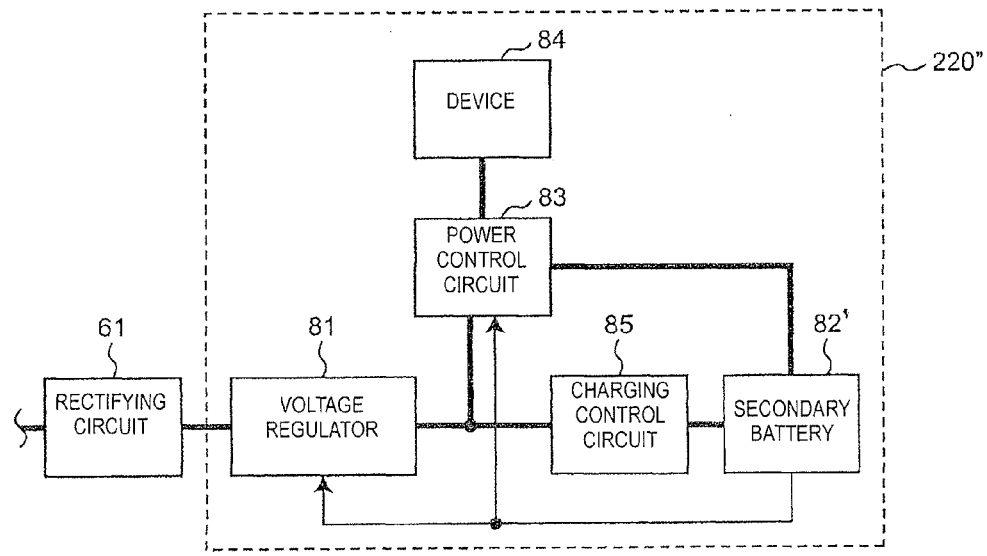
FIG. 14 is a block configuration diagram illustrating still another example of the load circuit.

Although the secondary battery 82 is explained incorporating the charge control circuit in the example of FIG. 13, the invention is not limited thereto. For example, like a load circuit 220" as illustrated in FIG. 14, a charge control circuit 85 may be provided to be isolated between the voltage regulator 81 and a secondary battery 82'.

Furthermore, the invention can be applied to the case where a voltage stabilization circuit of the load circuit of the power receiving device includes both of the DC/DC converter and the voltage regulator.

REFERENCE SIGNS LIST

30 POWER TRANSMITTER
31 POWER TRANSMISSION DEVICE-SIDE PASSIVE ELECTRODE (POWER TRANSMISSION-SIDE SECOND ELECTRODE)
32 POWER TRANSMISSION DEVICE-SIDE ACTIVE ELECTRODE (POWER TRANSMISSION-SIDE FIRST ELECTRODE)
37 BOOSTER CIRCUIT
40 POWER RECEIVER
41 POWER RECEIVING DEVICE-SIDE PASSIVE ELECTRODE (POWER RECEIVING-SIDE SECOND ELECTRODE)
42 POWER RECEIVING DEVICE-SIDE ACTIVE ELECTRODE (POWER RECEIVING-SIDE FIRST ELECTRODE)
45 STEP-DOWN CIRCUIT
51 DIRECT-CURRENT POWER SUPPLY
52 CONTROLLER
52A STORAGE UNIT
53 VDC/IDC DETECTION CIRCUIT
54 POWER SUPPLY UNIT
55 DRIVE CONTROL CIRCUIT
56 SWITCHING CIRCUIT
57 POWER CONVERTER
58 VAC DETECTION CIRCUIT
61 RECTIFYING CIRCUIT
71 DC/DC CONVERTER
72, 82, 82' SECONDARY BATTERY
81 VOLTAGE REGULATOR
83 POWER CONTROL CIRCUIT
84 DEVICE
85 CHARGE CONTROL CIRCUIT
100 POWER TRANSMISSION DEVICE
200 POWER RECEIVING DEVICE
210 POWER RECEIVING MODULE
220, 220', 220" LOAD CIRCUIT
CG, CL CAPACITOR
LG, LL INDUCTOR
OSC HIGH-FREQUENCY VOLTAGE GENERATION CIRCUIT
RL LOAD CIRCUIT
TG BOOSTER TRANSFORMER
TL STEP-DOWN TRANSFORMER

The invention claimed is:

1. A power transmission device that wirelessly transmits electric power to a power receiving device having a power receiver with a rectifying circuit that supplies a constant voltage to a load circuit, the power transmission device comprising:
a power supply unit that generates electric power and includes:
a direct-current (DC) power supply that supplies DC power, and
a power converter that switches ON/OFF the DC power supplied by the DC power supply to generate an alternating-current (AC) power and supplies the AC power to the power transmitter;
a power transmitter that transmits the AC power to the power receiver by capacitance coupling or electromagnetic coupling;
a detection circuit configured to detect a current value of a current flowing from the power supply unit that corresponds to a load impedance of the power receiving device; and
a controller configured to control the power supply unit to generate the electric power such that the voltage supplied by the rectifying circuit to the load circuit is equal to or less than a predetermined voltage based on a signal output by the detection circuit,
wherein, when the detected current value exceeds a predetermined value that is stored in memory of the controller and that relates to a charge state of a battery of the load circuit, the controller sets a duty ratio of the AC power supplied by the power converter based on a relation previously defined between the current value detected by the detection circuit and the duty ratio and continuously changes the duty ratio of the AC power in proportion to changes in the current value detected by the detection circuit, such that the rectifying circuit of the power receiver supplies the constant voltage to the load circuit of the power receiving device, and
wherein, when the current value is equal to or lower than the predetermined value relating to the charge state of the battery, the controller stops setting the duty ratio of the AC power.

2. The power transmission device according to claim 1, wherein the rectifying circuit supplies DC power to the load circuit of the power receiving device, and
wherein the power converter switches ON/OFF the DC voltage supplied by the DC power supply periodically so as to generate an AC voltage.

3. The power transmission device according to claim 1, wherein the power receiver includes a power receiving-side first electrode and a power receiving-side second electrode, and
wherein the power transmitter includes a power transmission-side first electrode that generates capacitance coupling with the power receiving-side first electrode and a power transmission-side second electrode that generates capacitance coupling with the power receiving-side second electrode.

4. The power transmission device according to claim 3, wherein a voltage of the power transmission-side first electrode is greater than a voltage of the power transmission-side second electrode during power transmission.

5. The power transmission device according to claim 4, wherein the power transmission device further includes a booster transformer with a secondary winding connected to and interposed between the power transmission-side first electrode and the power transmission-side second electrode and a primary winding connected to an output of the power converter.

6. A power transmission system comprising:
a power receiving device including a power receiver and a load circuit; and
a power transmission device including:
a power supply unit that generates electric power and includes:
a direct-current (DC) power supply that supplies DC power, and a power converter that switches ON/OFF the DC power supplied by the DC power supply to generate an alternating-current (AC) power and supplies the AC power to the power transmitter;
a power transmitter that transmits the electric power to the power receiver by capacitance coupling or electromagnetic coupling;
a detection circuit configured to detect a current value of a current flowing from the power supply unit that corresponds to a load impedance of the power receiving device; and a controller configured to control the power supply unit to generate the electric power such that the voltage supplied to the load circuit is equal to or less than a predetermined voltage based on a signal output by the detection circuit, wherein, when the detected current value exceeds a predetermined value that is stored in memory of the controller and that relates to a charge state of a battery of the load circuit, the controller sets a duty ratio of the AC power supplied by the power converter based on a relation previously defined between the current value detected by the detection circuit and the duty ratio and continuously changes the duty ratio of the AC power in proportion to changes in the current value detected by the detection circuit, such that the power receiver supplies the voltage as a constant voltage to the load circuit of the power receiving device, and wherein, when the current value is equal to or lower than the predetermined value relating to the charge state of the battery, the controller stops setting the duty ratio of the AC power.

7. The power transmission system according to claim 6, wherein the power receiving device further comprises a rectifying circuit that supplies DC power to the load circuit.

8. The power transmission system according to claim 6, wherein the power converter switches ON/OFF the DC voltage supplied by the DC power supply periodically so as to generate an AC voltage.

9. The power transmission system according to claim 6, wherein the load circuit includes a voltage stabilization circuit and the battery that is connected to a secondary side of the voltage stabilization circuit.

10. The power transmission system according to claim 6, wherein the power receiver includes a power receiving-side first electrode and a power receiving-side second electrode, and wherein the power transmitter includes a power transmission-side first electrode that generates capacitance coupling with the power receiving-side first electrode and a power transmission-side second electrode that generates capacitance coupling with the power receiving-side second electrode.

11. The power transmission system according to claim 10, wherein a voltage of the power transmission-side first electrode is greater than a voltage of the power transmission-side second electrode during power transmission.

12. The power transmission system according to claim 11, wherein the power transmission device further includes a booster transformer with a secondary winding connected to and interposed between the power transmission-side first electrode and the power transmission-side second electrode and a primary winding connected to an output of the power converter.

13. A power transmission method for wirelessly transmitting electric power from a power transmission device to a power receiving device having a power receiver that supplies a constant voltage to a load circuit, the method comprising:

generating electric power by a power supply unit by supplying direct-current (DC) power from a DC power supply and switching ON/OFF, by a power converter, the DC power supplied by the DC power supply periodically to generate an alternating-current (AC) power;

supplying the AC power to a power transmitter;

detecting, by a detection circuit, a current value of a current flowing from the power supply unit that corresponds to a load impedance of the power receiving device; and controlling the power supply unit to generate the electric power such that the voltage supplied by the power receiver to the load circuit is equal to or less than a predetermined voltage based on the load impedance; and setting a duty ratio of the AC power supplied by the power converter based on a relation previously defined between the current value detected by the detection circuit and the duty ratio, when the detected current value exceeds a predetermined value relating to a charge state of a battery of the load circuit;

continuously changing the duty ratio of the AC power supplied by the power converter in proportion to changes in the current value detected by the detection circuit, such that the power receiver supplies the constant voltage to the load circuit of the power receiving device; and ending the setting of the duty ratio of the AC power when the detected current value is equal to or lower than the predetermined value relating to the charge state of the battery.

14. The power transmission device according to claim 1, wherein the controller is configured to continually adjust the duty ratio of the AC power based on the detected current value as long as the detected current value exceeds the predetermined value.

15. The power transmission device according to claim 14, wherein the controller is configured to end power transmission to the power receiving device when the detected current value equal to or lower than the predetermined value.

16. The power transmission device according to claim 1, wherein the controller is configured to set and adjust the duty ratio based on the current value detected by the detection circuit by calculation using a function.

17. The power transmission device according to claim 1, wherein the controller continuously changes the duty ratio of the AC power smoothly and without stages, such that the power transmitter transmits the AC power to the power receiver causing the rectifying circuit to supply the constant voltage to the load circuit of the power receiving device.

18. The power transmission system according to claim 6, wherein the controller continuously changes the duty ratio of the AC power smoothly and without stages, such that the power transmitter transmits the AC power to the power receiver causing the power receiver to supply the constant voltage to the load circuit of the power receiving device.

19. The power transmission method according to claim 13, further comprising continuously changing the duty ratio of the AC power smoothly and without stages, such that the power receiver supplies the constant voltage to the load circuit of the power receiving device.

* * * * *